(12) United States Patent
Li et al.

(10) Patent No.: US 11,973,614 B2
(45) Date of Patent: Apr. 30, 2024

(54) METHODS AND SYSTEMS FOR COMMUNICATION

(71) Applicant: Comcast Cable Communications, LLC, Philadelphia, PA (US)

(72) Inventors: Yubin Li, Philadelphia, PA (US); Jiongkuan Hou, Mount Laurel, NJ (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 131 days.

(21) Appl. No.: 16/219,567

(22) Filed: Dec. 13, 2018

(65) Prior Publication Data

US 2020/0195455 A1  Jun. 18, 2020

(51) Int. Cl.
*H04L 12/18* (2006.01)
*H04L 29/06* (2006.01)
*H04L 65/1069* (2022.01)
*H04L 65/403* (2022.01)
*H04L 65/611* (2022.01)

(52) U.S. Cl.
CPC .......... *H04L 12/185* (2013.01); *H04L 12/189* (2013.01); *H04L 65/1069* (2013.01); *H04L 65/403* (2013.01); *H04L 65/611* (2022.05)

(58) Field of Classification Search
None
See application file for complete search history.

(56) References Cited

U.S. PATENT DOCUMENTS

| | | | |
|---|---|---|---|
| 2006/0233106 A1* | 10/2006 | Achlioptas | H04L 67/1023 370/428 |
| 2008/0274759 A1* | 11/2008 | Chen et al. | |
| 2009/0201844 A1* | 8/2009 | Bhatti et al. | |
| 2011/0122784 A1* | 5/2011 | Ananthanarayanan et al. | |
| 2012/0144445 A1* | 6/2012 | Bonta | H04L 12/1868 725/116 |
| 2012/0270574 A1* | 10/2012 | Nishida et al. | |
| 2014/0050141 A1* | 2/2014 | Ma | H04W 4/70 370/312 |
| 2014/0365635 A1* | 12/2014 | Rastogi | G06F 9/54 709/224 |
| 2015/0281769 A1* | 10/2015 | Chiu et al. | |
| 2016/0249266 A1* | 8/2016 | Kim | H04W 4/06 |
| 2018/0192009 A1* | 7/2018 | Jeong | H04N 7/186 |
| 2018/0278632 A1* | 9/2018 | Fu | H04L 9/40 |
| 2020/0267513 A1* | 8/2020 | Zhu et al. | |

* cited by examiner

*Primary Examiner* — Steve R Young
(74) *Attorney, Agent, or Firm* — Ballard Spahr LLP

(57) ABSTRACT

Communication techniques (e.g., IP-based communications, multicast communications, unicast communications, wireless communications, etc.) are described. Devices may establish discrete communication sessions, with defined start and end times determined at the network layer of an Open Systems Interconnection (OSI) model, to exchange content.

20 Claims, 6 Drawing Sheets

METHODS AND SYSTEMS FOR COMMUNICATION

BACKGROUND

Existing Internet Protocol-based communications systems (e.g., Voice Over Internet Protocol (VoIP)) use protocols such as the Session Initiation Protocol (SIP) to start and end communication sessions between devices. This allows devices to communicate across networks and enables various calling features, but requires computationally complex handshaking and troubleshooting.

SUMMARY

It is to be understood that both the following general description and the following detailed description are exemplary and explanatory only and are not restrictive. Methods and systems for communication (e.g., IP-based communications, multicast communications, unicast communications, wireless communications, etc.) are described. Devices may establish discrete communication sessions, with defined start and end times determined at the network layer (e.g., layer 3) of an OSI model, to exchange content (e.g., multimedia content, data/information, etc.). A user device may send content to one or more recipient devices on the same network subnet. Each of the recipient devices may be included in (e.g., associated with, etc.) the same multicast group. The user device may send a message to the multicast group indicating a start of an IP multicast communications session, and then send the content to the multicast group via IP multicast. Based on receiving the message indicating the start of the IP multicast communications session, the recipient devices process (e.g., decode, transcode, relay, store, render, etc.) content received from the user device until another message indicating an end of the IP multicast communications session.

This summary is not intended to identify critical or essential features of the disclosure, but merely to summarize certain features and variations thereof. Other details and features will be described in the sections that follow.

BRIEF DESCRIPTION OF THE DRAWINGS

The accompanying drawings, which are incorporated in and constitute a part of this specification, together with the description, serve to explain the principles of the methods and systems.

DETAILED DESCRIPTION

Figure 1:
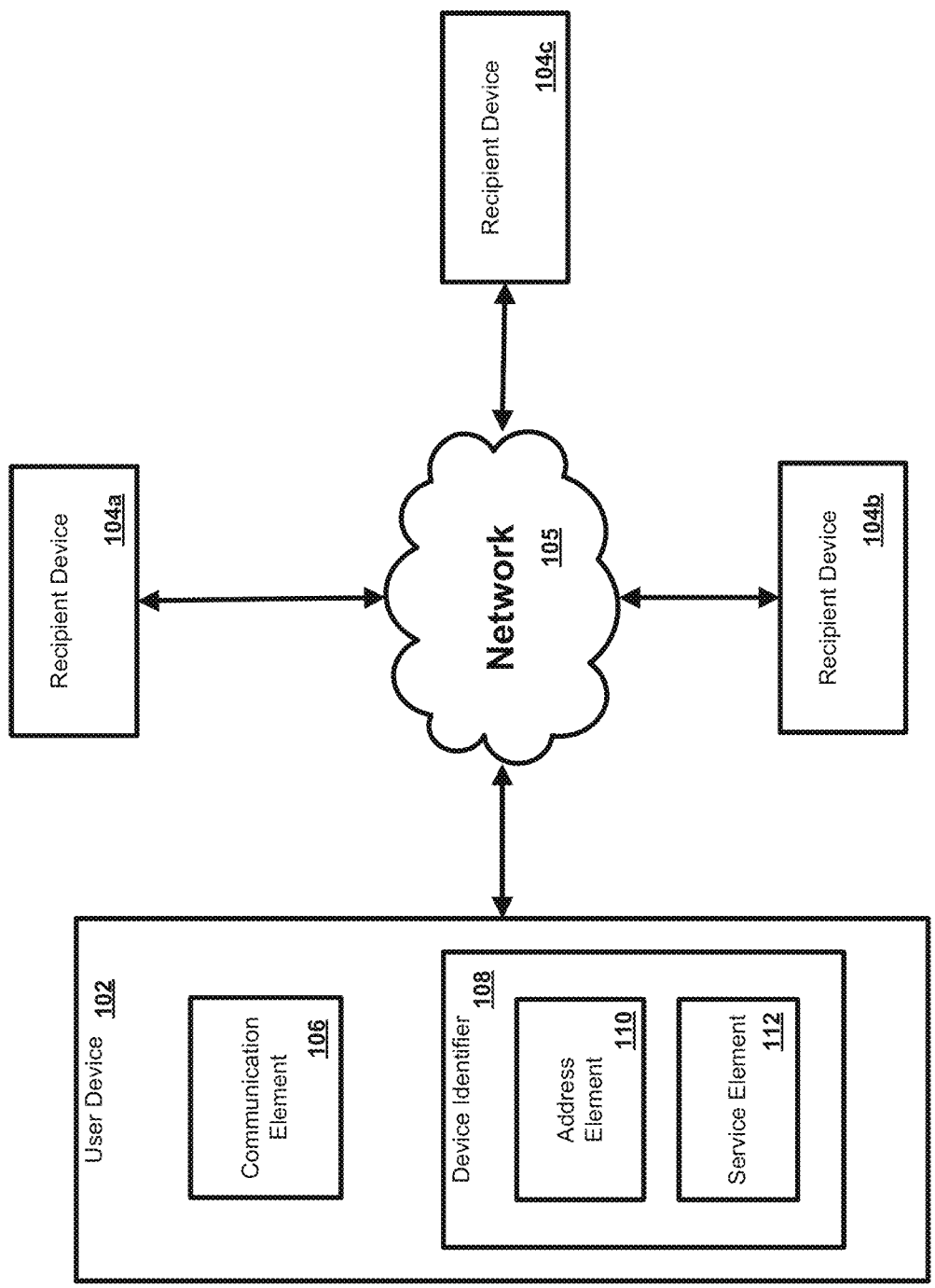
FIG. 1 shows a system for IP multicast communication.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another configuration includes from the one particular value and/or to the other particular value. When values are expressed as approximations, by use of the antecedent "about," it will be understood that the particular value forms another configuration. It will be further understood that the endpoints of each of the ranges are significant both in relation to the other endpoint, and independently of the other endpoint.

"Optional" or "optionally" means that the subsequently described event or circumstance may or may not occur, and that the description includes cases where said event or circumstance occurs and cases where it does not.

Throughout the description and claims of this specification, the word "comprise" and variations of the word, such as "comprising" and "comprises," means "including but not limited to," and is not intended to exclude other components, integers or steps. "Exemplary" means "an example of" and is not intended to convey an indication of a preferred or ideal configuration. "Such as" is not used in a restrictive sense, but for explanatory purposes.

It is understood that when combinations, subsets, interactions, groups, etc. of components are described that, while specific reference of each various individual and collective combinations and permutations of these may not be explicitly described, each is specifically contemplated and described herein. This applies to all parts of this application including, but not limited to, steps in described methods. Thus, if there are a variety of additional steps that may be performed it is understood that each of these additional steps may be performed with any specific configuration or combination of configurations of the described methods.

As will be appreciated by one skilled in the art, hardware, software, or a combination of software and hardware may be implemented. Furthermore, a computer program product on a computer-readable storage medium (e.g., non-transitory) having processor-executable instructions (e.g., computer software) embodied in the storage medium. Any suitable computer-readable storage medium may be utilized including hard disks, CD-ROMs, optical storage devices, magnetic storage devices, memresistors, Non-Volatile Random Access Memory (NVRAM), flash memory, or a combination thereof.

Throughout this application reference is made block diagrams and flowcharts. It will be understood that each block of the block diagrams and flowcharts, and combinations of blocks in the block diagrams and flowcharts, respectively, may be implemented by processor-executable instructions. These processor-executable instructions may be loaded onto a general purpose computer, special purpose computer, or other programmable data processing apparatus to produce a machine, such that the processor-executable instructions which execute on the computer or other programmable data processing apparatus create a device for implementing the functions specified in the flowchart block or blocks.

These processor-executable instructions may also be stored in a computer-readable memory that may direct a computer or other programmable data processing apparatus to function in a particular manner, such that the processor-executable instructions stored in the computer-readable memory produce an article of manufacture including processor-executable instructions for implementing the function specified in the flowchart block or blocks. The processor-executable instructions may also be loaded onto a computer or other programmable data processing apparatus to cause a series of operational steps to be performed on the computer or other programmable apparatus to produce a computer-implemented process such that the processor-executable instructions that execute on the computer or other programmable apparatus provide steps for implementing the functions specified in the flowchart block or blocks.

Accordingly, blocks of the block diagrams and flowcharts support combinations of devices for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

"Content items," as the phrase is used herein, may also be referred to as "content," "content (e.g., multimedia content, data/information, etc.)," "content information," "content asset," "multimedia asset data file," or simply "data" or "information". Content items may be any information or data that may be licensed to one or more individuals (or other entities, such as business or group). Content may be electronic representations of video, audio, text and/or graphics, which may be but is not limited to electronic representations of videos, movies, or other multimedia, which may be but is not limited to data files adhering to MPEG2, MPEG, MPEG4 UHD, HDR, 4 k, Adobe® Flash® Video (.FLV) format or some other video file format whether such format is presently known or developed in the future. The content items described herein may be electronic representations of music, spoken words, or other audio, which may be but is not limited to data files adhering to the MPEG-1 Audio Layer 3 (.MP3) format, Adobe®, CableLabs 1.0, 1.1, 3.0, AVC, HEVC, H.264, Nielsen watermarks, V-chip data and Secondary Audio Programs (SAP). Sound Document (.ASND) format or some other format configured to store electronic audio whether such format is presently known or developed in the future. In some cases, content may be data files adhering to the following formats: Portable Document Format (.PDF), Electronic Publication (.EPUB) format created by the International Digital Publishing Forum (IDPF), JPEG (.JPG) format, Portable Network Graphics (.PNG) format, dynamic ad insertion data (.csv), Adobe® Photoshop® (.PSD) format or some other format for electronically storing text, graphics and/or other information whether such format is presently known or developed in the future. Content items may be any combination of the above-described formats.

"Consuming content" or the "consumption of content," as those phrases are used herein, may also be referred to as "accessing" content, "providing" content, "viewing" content, "listening" to content, "rendering" content, or "playing" content, among other things. In some cases, the particular term utilized may be dependent on the context in which it is used. Consuming video may also be referred to as viewing or playing the video. Consuming audio may also be referred to as listening to or playing the audio.

This detailed description may refer to a given entity performing some action. It should be understood that this language may in some cases mean that a system (e.g., a computer) owned and/or controlled by the given entity is actually performing the action.

Methods and systems for communication (e.g., IP-based communications, multicast communications, unicast communications, wireless communications, etc.) are described herein. A discrete session (having a start/end time), such as a discrete session in (associated with) an IP multicast communication, may use packets indicating a start and an end of an IP multicast session. This technique may be implemented at the network (e.g., IP) layer of the Open Systems Interconnection (OSI) model (vs the application layer), with session control using IP multicasting at the IP layer. Devices may establish discrete communication sessions (e.g., IP-based communication sessions, multicast communication sessions, unicast communication session, wireless communication sessions, etc.) with defined start and end times determined at the network layer of an OSI model, to exchange content.

Commercial Voice Over Internet Protocol (VoIP) solutions use protocols such as a Session Initiation Protocol (SIP) to establish, manage, and tear down an audio/video session between two devices (e.g., user devices, IP-enabled phones, IADs, etc.). The SIP protocol allows communication between terminals on different networks, across different platforms, and supports various call features such as three-way calling, call forwarding, etc. However, SIP is a complicated and evolving protocol, due to resources needed to design, develop, update, and troubleshoot the SIP stack in a device, SIP terminals are expensive, and a SIP network is complicated to manage.

There are certain use cases where multimedia communication between two IP-enabled devices within a local area network (LAN) is necessary and/or required. A security camera may initiate a video communication session with a video capable IP-enabled phone, a video recording device, any other monitoring device, and/or the like when motion is detected. A building intercom transceiver may initiate and/or facilitate a voice communication session between tenants/users when a button is pushed. A vending machine may send a pre-recorded message to an IP-enabled phone, such as store manager's desk phone and/or the like, when product stock of is low.

In machine-to-machine communication scenarios, building a SIP stack into such IP-enabled devices is excessively complex and computationally intensive. A simplified communication initiation-teardown process between user devices (e.g., IP-enabled devices, etc.) is described. IP multicast allows a user device to send IP packets to a group of recipient devices on the same subnet simultaneously. The user device may send specially formatted multicast messages indicating the start and the end of a multicast communication session. During the multicast communication session, the user device may send content (e.g., multimedia content, data/information, etc.) via IP multicast to the recipient devices. The recipient devices may then automatically process (e.g., decode, transcode, relay, store, render, etc.) the received content. The recipient devices may decode, render, and/or playback the received content. Where user devices and recipient devices are capable of sending/receiving content (e.g., multimedia content, data/information, etc.), duplex communication (e.g., half-duplex communication, or full-duplex communication, etc.) may be achieved, enabled, and/or simulated by implementing additional IP multicast groups within which content may be exchanged (e.g., sent, received, etc.). User devices and/or recipient devices of and/or within different/separate IP multicast groups may send and/or receive content (e.g., multimedia content, data/information, etc.) via simplex IP multicast communication sessions (e.g., real-time simplex IP multicast communication sessions, etc.) where the exchange of content achieves, enables, and/or simulates duplex communication. The described communication techniques may be modified and/or changed according to different communication types (e.g., IP-based communications, multicast communications, unicast communications, wireless communications, etc.). The described communication techniques may be suitable for any communication technique.

FIG. 1 shows a system 100 for communication (e.g., IP-based communication, multicast communication, unicast communication, wireless communication, etc.). The system 100 may include a user device 102. The user device 102 may be in communication with one or more recipient devices 104a,b,c. The user device 102 and the recipient devices 104a,b,c may be in communication via a private and/or public network 105 such as the Internet or a local area network. Other forms of communications may be used such as wired and wireless telecommunication channels. The user device 102 and the recipient devices 104a,b,c may be included in (associated with) the same subnet of the network 105.

The user device 102 may be an electronic device such as a computer, a smartphone, a laptop, a tablet, a set top box, a display device, or other device capable of communicating with the recipient devices 104a,b,c. The user device 102 may have a communication element 106 for providing an interface to a user to interact with the user device 102 and/or the recipient devices 104a,b,c. The communication element 106 may be any interface for presenting and/or receiving information to/from the user, such as user feedback. An interface may be communication interface such as a web browser (e.g., Internet Explorer®, Mozilla Firefox®, Google Chrome®, Safari®, or the like). Other software, hardware, and/or interfaces may be used to provide communication between the user and one or more of the user device 102 and the recipient devices 104a,b,c.

The user device 102 may be associated with a user identifier or device identifier 108. The device identifier 108 may be any identifier, token, character, string, or the like, for differentiating one user or user device (e.g., user device 102) from another user or user device. The device identifier 108 may identify a user or user device as belonging to a particular class of users or user devices. The device identifier 108 may be information relating to the user device such as a manufacturer, a model or type of device, a service provider associated with the user device 102, a state of the user device 102, a locator, and/or a label or classifier. Other information may be represented by the device identifier 108.

The device identifier 108 may be an address element 110 and a service element 112. The address element 110 may be, or provide, an internet protocol address, a network address, a media access control (MAC) address, an Internet address, or the like. The address element 110 may be relied upon to establish a communication session between the user device 102 and the computing device 104 or other devices and/or networks. The address element 110 may be used as an identifier or locator of the user device 102. The address element 110 may be persistent for a particular network.

The service element 112 may be an identification of a service provider associated with the user device 102 and/or with the class of the user device 102. The class of the user device 102 may be related to a type of the user device 102, a capability of the user device 102, a type of service being provided, and/or a level of service (e.g., business class, service tier, service package, etc.). The service element 112 may be information relating to, or provided by, a communication service provider (e.g., Internet service provider) that is providing or enabling data flow such as communication services to the user device 102. The service element 112 may be information relating to a preferred service provider for one or more particular services relating to the user device 102. The address element 110 may be used to identify or retrieve data from the service element 112, or vice versa. One or more of the address element 110 and/or the service element 112 may be stored remotely from the user device 102 and retrieved by one or more devices such as the user device 102 and/or the computing device 104. Other information may be represented by the service element 112.

The recipient devices 104a,b,c may be devices that process content (e.g., multimedia content, data/information, etc.) received from the user device 102 via the network 105. Processing the content may include decoding, rendering, playing, recording, storing, interacting with, and/or the like the content. The recipient devices 104a,b,c may be devices and/or terminals that are dedicated to processing content (e.g., speaker devices in an intercom system configured to play and/or render received audio content, video storage devices in a security system configured for storing video content received from one or more security cameras, etc.) received from the user device 102 and/or any other device. The recipient devices 104a,b,c may also be user devices configured to and/or capable of sending content (e.g., multimedia content, data/information, etc.) and receiving content.

The user device 102 may send a message (e.g., one or more packets, an IP packet comprising a multicast group address in a IP header destination address field, etc.) to the recipient devices 104a,b,c indicating the start of a multicast communication session (e.g., via IP multicast). The message may be a flag, an identifier, a header, or any other indicator of the start of the multicast communication session. The use of a single message indicating the start of the multicast communication session saves on the computational overhead required by protocols for device-to-device communication (e.g., SIP) that require complex handshaking to establish and to end a communication session.

The user device 102 may send the message to a multicast group including the recipient devices 104a,b,c. The multicast group may be defined through device configuration. The user device 102 or another device may add the recipient devices 104a,b,c to the multicast group through a user interface or application program interface (API). The multicast group may also be defined by sending a discovery request (e.g., via multicast or broadcast) to a subnet that includes the user device 102 and the recipient devices 104a,b,c. The recipient devices 104a,b,c may send, to a source of the discovery request (e.g., the user device 102 or another device), a response indicating that one or more of the recipient devices 104a,b,c should be added to a multicast group. The multicast group may be associated with a unique identifier. Network traffic (e.g., content, etc.), based on the unique identifier and via IP multicast, may be delivered to the recipient devices 104a,b,c included in (associated with) the multicast group. The multicast group may also be associated with a unique network address within the subnet of the network 105. Network traffic (e.g., content, etc.) addressed/directed to the unique network address may be delivered, via IP multicast, to the recipient devices 104a,b,c included in (associated with) the multicast group.

The user device 102 may send content (e.g., multimedia content, etc.) to the multicast group via IP multicast. The content may include audio content and/or video content. The user device 102 may send the content and/or a portion of the content in the message indicating the start of the multicast communication session. A flag or a header of an initial portion(s) (e.g., packet(s)), such as a first/beginning portion, of the content may indicate the start of the multicast communication session. The content (e.g., multimedia content, data/information, etc.) may be encoded in packets or datagrams separate from the message indicating the start of the multicast communication session.

The recipient devices 104a,b,c may be configured to automatically process (e.g., decode, transcode, relay, store, render, etc.) the content (e.g., multimedia content, data/information, etc.) received. The recipient devices 104a,b,c may be configured to automatically process (e.g., decode, transcode, relay, store, render, etc.) the content (e.g., multimedia content, data/information, etc.) until a message indicating an end of the multicast communication session is received. The recipient devices 104a,b,c may process the content in parallel with reception of the content (e.g., multimedia content, data/information, etc.), such as at a same and/or substantially the same time as the content (e.g., multimedia content, data/information, etc.) is being received (e.g., receiving and processing the content in real-time, etc.). The recipient devices 104a,b,c may process the content (e.g., multimedia content, data/information, etc.) after an end to the multicast communication session. The recipient devices 104a,b,c may process the content (e.g., multimedia content, data/information, etc.) according to a codec, such as a unique codec, a shared codec, a predefined, a preset codec, and/or the like. The codec may be defined during an initial setup and/or manufacture of the recipient devices 104a,b,c. The codec may be defined by and/or according to device configuration (e.g., by the user device 102, by another device, etc.) prior to the start of the multicast communication session. Codec negotiation between the user device 102 and the recipient devices 104a,b,c may not be necessary and/or required to establish the multicast communication session and/or process the content (e.g., multimedia content, data/information, etc.), which may reduce the overall computational overhead of the multicast communication session.

The user device 102 may send a message (e.g., one or more packets, an IP packet comprising a multicast group address in a IP header destination address field, etc.) to the recipient devices 104a,b,c indicating the end of the multicast communication session. The message may be a flag, an identifier, a header, or any other indicator of the end of the multicast communication session. The flag, the identifier, the header, or any other indicator may be applied to a subsequent portion(s) (e.g., packet(s)), such as a final/last sent portion, of the content (e.g., multimedia content, data/information, etc.). The use of a single message indicating the end of the multicast communication session saves on the computational overhead required by protocols for device-to-device communication (e.g., SIP) that require complex handshaking to end or "tear down" a communication session. The user device 102 may send the message (e.g., one or more packets, an IP packet comprising a multicast group address in a IP header destination address field, etc.) to the recipient devices 104a,b,c indicating the end of the multicast communication session. The message may be sent based on a time period, such as when the time period expires. The time period may be based on any amount/quantity of time, such as an amount/quantity of time required for the recipient devices 104a,b,c to process the content. The time required for the recipient devices 104a,b,c to process the content may be based on a user defined and/or a predetermined amount/quantity of time, a previous amount/quantity of time used by the recipient devices 104a,b,c to process content (e.g., similar content), and/or the like.

Figure 2:
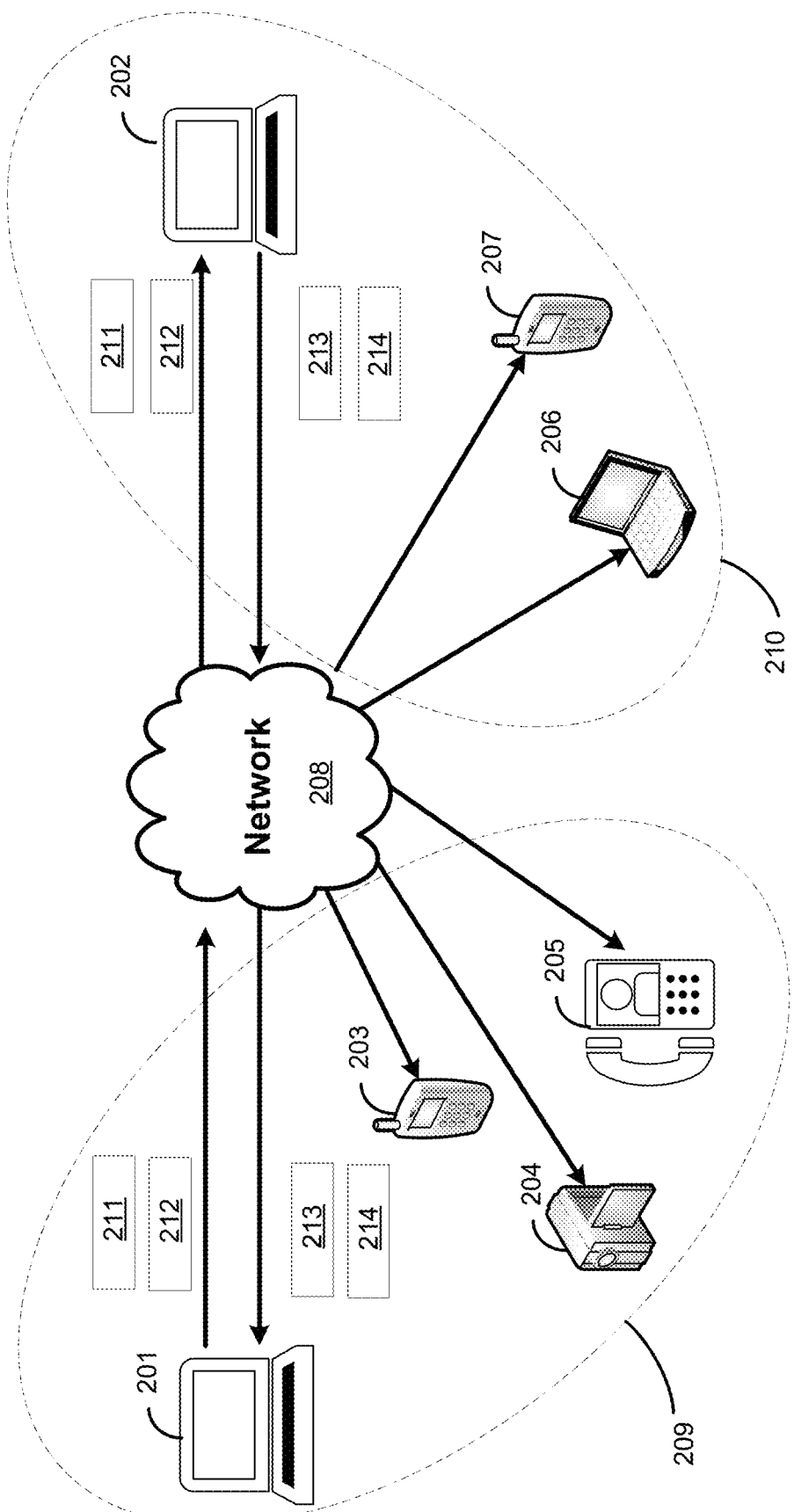
FIG. 2 shows a system for IP multicast communication.

FIG. 2 shows a system 200 for Internet Protocol (IP) multicast communication. The system 100 may include a user device 201 and a user device 202. The system 200 may include devices 203, 204, 205, 206, and 207. The user device 201 and/or the user device 202 may be in communication with the devices 203, 204, 205, 206, and 207 via a network 208. The user device 201, the user device 202, and/or devices 203, 204, 205, 206, and 207 are capable of sending/receiving content (e.g., multimedia content, data/information, etc.), duplex communication (e.g., half-duplex communication, or full-duplex communication, etc.) may be achieved, enabled, and/or simulated by implementing multiple (e.g., at least two) IP multicast groups to which content may be sent. The user device 201 and the devices 203, 204, and 205 may be part of a multicast group 209. The user device 202 and the devices 206, and 207 may be part of an IP multicast group 210. The user device 201, the user device 202, and the devices 203, 204, 205, 206, and 207 within the different the multicast groups 209 and 210 may receive and/or send content (e.g., multimedia content, data/information, etc.) via simplex IP multicast communication sessions (e.g., real-time simplex IP multicast communication sessions, etc.) and the exchange of content may achieve, enable, and/or simulate duplex communication between the user device 201, the user device 202, and the devices 203, 204, 205, 206, and 207.

The user device 201 may send a message 211 (e.g., one or more packets, an IP packet comprising a multicast group address in a IP header destination address field, etc.) to the user device 202 that indicates a start of a first multicast communication session. The message may be generated based on a trigger condition, such as a trigger condition associated with the user device 201 and/or any of the devices 203, 204, 205, 206, and 207. The trigger condition may be based on a detection of motion by and/or associated with the user device 201 and/or any of the devices 203, 204, 205, 206, and 207. The trigger condition may be based on the user device 201 detecting an interaction associated with the user device 201, based on the user device 201 determining that a threshold associated with the user device 201 is satisfied, such as product inventory threshold being satisfied by a low amount/quantity of product. The trigger condition may be based on any condition.

The message 211 may be and/or include a flag, an identifier, a header, or any other indicator of the start of the first multicast communication session. The message 211 may include content (e.g., multimedia content, first content, data/information, etc.), such as content encoded in packets and/or datagrams. In some cases, the message 211 may not include content (e.g., multimedia content, first content, etc.), and the user device 202 may receive the content during the first multicast communication session. A flag or header of an initial portion(s) (e.g., packet(s)), such as a first/beginning portion, of the content (e.g., multimedia content, data/information, etc.) may indicate the start of the first multicast communication session.

The user device 202 may automatically process (e.g., decode, transcode, relay, store, render, play, or otherwise interact with the content (e.g., multimedia content, first content, etc.). The user device 202 may process the content according to a predefined or preset codec. The content and/or the codec may be shared (e.g., by the user device 202) with the devices 206, and 207 (or any other device). The content (e.g., multimedia content, first content, etc.) may be video and the codec shared with the devices 206 and 207 may be used by each device to process the content.

Each device within the multicast group 210 may process the content until the user device 201 sends a message 212 to the user device 202. The message 212 may be and/or include a flag, an identifier, a header, or any other indicator of the end of the first multicast communication session. The flag, the identifier, the header, or any other indicator may be applied to a subsequent portion(s) (e.g., packet(s)), such as a last/final portion, of the content (e.g., multimedia content, data/information, etc.).

To achieve duplex communication between devices, such as the user device 201 and the user device 202, the user device 202 may send a message 213 (e.g., one or more packets, an IP packet comprising a multicast group address in a IP header destination address field, etc.) to the user device 201 that indicates a start of a second multicast communication session. The message may be generated based on a trigger condition, such as a trigger condition associated with the user device 202 and/or any of the devices 203, 204, 205, 206, and 207. The trigger condition may be based on any condition.

The message 213 may be and/or include a flag, an identifier, a header, or any other indicator of the start of the second multicast communication session. The message 213 may include content (e.g., multimedia content, first content, data/information, etc.), such as content encoded in packets and/or datagrams. In some cases, the message 213 may not include content (e.g., multimedia content, first content, etc.), and the user device 201 may receive the content during the second multicast communication session. A flag or header of an initial portion(s) (e.g., packet(s)), such as a first/beginning portion, of the content (e.g., multimedia content, data/information, etc.) may indicate the start of the second multicast communication session.

The user device 201 may automatically process (e.g., decode, transcode, relay, store, render, play, or otherwise interact with the content (e.g., multimedia content, first content, etc.). The user device 201 may process the content according to a predefined or preset codec. The content and/or the codec may be shared (e.g., by the user device 201) with the devices 203, 204 and 205 (or any other device). The content (e.g., multimedia content, first content, etc.) may be video and the codec shared with the devices 203, 204 and 205 may be used by each device to process the content.

Each device within the multicast group 209 may process the content until the user device 201 sends a message 214 to the user device 201. The message 214 may be and/or include a flag, an identifier, a header, or any other indicator of the end of the second multicast communication session. The flag, the identifier, the header, or any other indicator may be applied to a subsequent portion(s) (e.g., packet(s)), such as a last/final portion, of the content (e.g., multimedia content, data/information, etc.).

Figure 3:
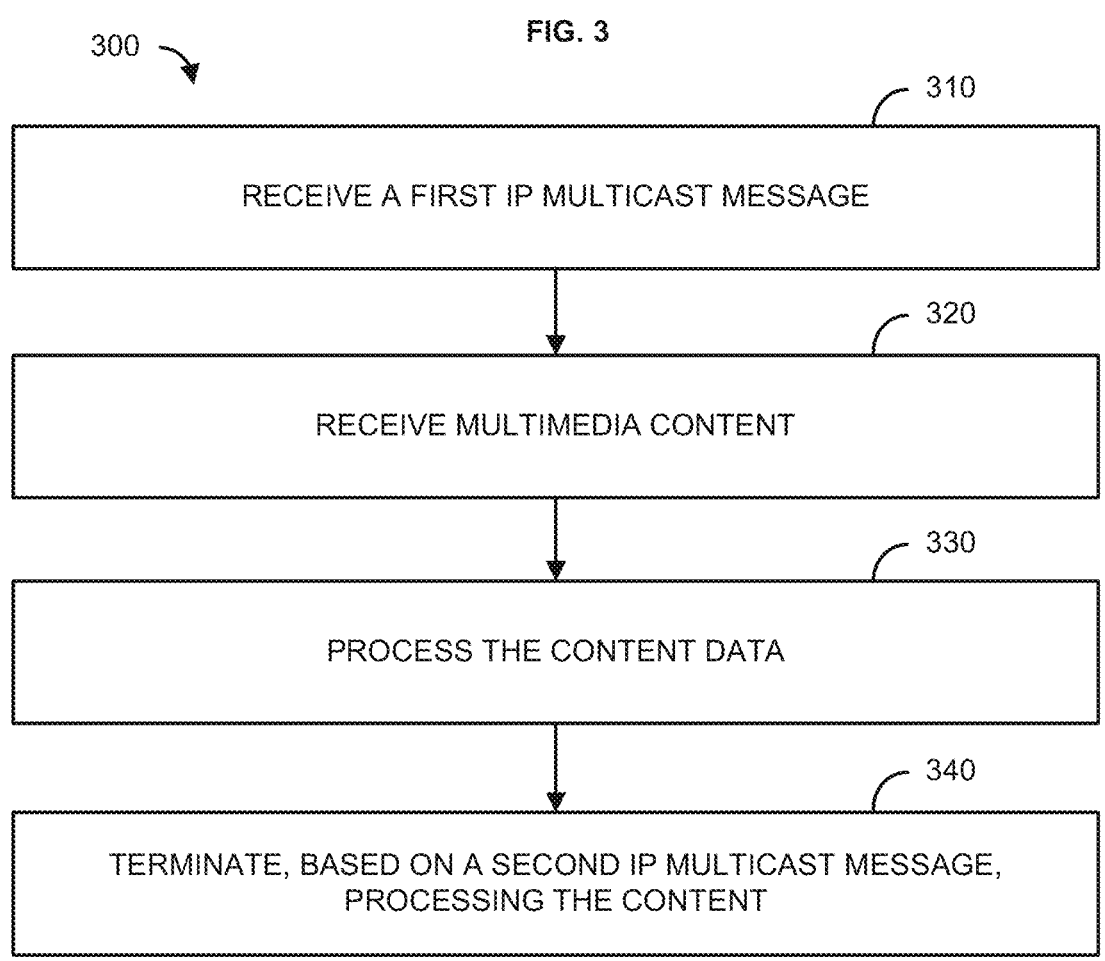
FIG. 3 shows a flowchart of a method for communication.

FIG. 3 is a flowchart 300 of a method for communication. The method 300 may be adapted to and/or suitable for any communication technique such as IP-based communications, multicast communications, unicast communications, wireless communications, and/or the like. At step 310, a message (e.g., one or more packets, an IP packet comprising a multicast group address in a IP header destination address field, etc.) indicating the start of a multicast communication session may be received via IP multicast (e.g., from the user device 102 by one or more of the recipient devices 104a,b,c). The user device 102 and the recipient devices 104a,b,c may be included in a same subnet of the network 105. The message may be generated based on a trigger condition, such as a trigger condition associated with the user device 102 and/or any of the recipient devices 104a,b,c. The trigger condition may be based on a detection of motion by and/or associated with the user device 102 and/or any of the recipient devices 104a,b,c. The trigger condition may be based on the user device 102 and/or any of the recipient devices 104a,b,c detecting an interaction associated with the user device 102 and/or any of the recipient devices 104a,b,c, such as a press of a button and/or the like. The trigger condition may be based on the user device 102 and/or any of the recipient devices 104a,b,c determining that a threshold associated with the user device 102 and/or any of the recipient devices 104a,b,c is satisfied, such as product inventory threshold being satisfied by a low amount/quantity of product. The trigger condition may be based on any condition.

The message may be part of the IP multicast or the message may be sent separately from the IP multicast. The message indicating the start of the multicast communication session may be a flag, an identifier, a header, or any other indicator of the start of the multicast communication session. The message may be directed to a particular multicast group including one or more of the recipient devices 104a,b,c. The message may be addressed to a multicast network address corresponding to the particular multicast group. In some cases, the message indicating the start of the multicast communication session may be sent separate from and/or without content (e.g., multimedia content, data/information, etc.). In some cases, the message indicating the start of the multicast communication session may be sent as part of the multicast communication session, such that the multicast communication session is established and data/information may be sent (as packets and/or datagrams, etc.) simultaneously and/or at substantially the same time/occurrence as initiation/establishment of the multicast communication session. In some cases, the message indicating the start of the multicast communication session may include content (e.g., multimedia content, data/information, etc.). In some cases, the message indicating the start of the multicast communication session may not include content (e.g., multimedia content, etc.), and content may be received during the multicast communication session. Content sent with the message indicating the start of the multicast communication session and/or received during the multicast communication session may be encoded in packets and/or datagrams.

At step 320, content (e.g., multimedia content, data/information, etc.) may be received via the IP multicast (e.g., from the user device 102 by one or more of the recipient devices 104a,b,c). The content (e.g., multimedia content, data/information, etc.) may be directed to the particular multicast group including the recipient device 104a,b,c. The content (e.g., multimedia content, data/information, etc.) may be encoded in and/or with network traffic addressed to the multicast network address corresponding to the particular multicast group. The content (e.g., multimedia content, data/information, etc.) may include audio content, video content, and/or the like. When the message indicating the start of the multicast communication session includes content (e.g., multimedia content, data/information, etc.), a flag or a header of an initial portion(s) (e.g., packet(s)), such as a first/beginning portion, of the content may indicate the start of the multicast communication session.

At step 330, the content (e.g., multimedia content, data/information, etc.) may be processed (e.g., by the recipient devices 104a,b,c). Processing the content (e.g., multimedia content, data/information, etc.) may be decoding, transcoding, relaying, storing, rendering, playing, or otherwise interacting with the content. The recipient devices 104a,b,c may be receiver or speaker devices of an intercom system, and processing the content (e.g., multimedia content, data/information, etc.) may be playing audio content (e.g., multimedia content, data/information, etc.) received from a sending user device 102 having a microphone or other audio input. The recipient devices 104a,b,c may be a monitor of a video system (e.g., a security system, a baby monitoring system, or a studio recording system), and processing the content (e.g., multimedia content, data/information, etc.) may be outputting, to a display, video and/or audiovisual content (e.g., multimedia content, data/information, etc.) received from a sending user device 102 (e.g., a camera). The recipient devices 104*a,b,c* may be a data storage unit of a system (e.g., a security system, a baby monitoring system, or studio recording system), and processing the content (e.g., multimedia content, data/information, etc.) may be storing content (e.g., multimedia content, data/information, etc.) received from a sending user device 102 (e.g., a camera and/or a microphone).

The recipient devices 104*a,b,c* may be configured to automatically process the received content (e.g., multimedia content, data/information, etc.) (e.g., until receiving a message indicating an end of the multicast communication session). The recipient devices 104*a,b,c* may be configured to process the content (e.g., multimedia content, data/information, etc.) in parallel with receiving the content (e.g., multimedia content, data/information, etc.) (e.g., in substantially real-time). The recipient devices 104*a,b,c* may be configured to process the content (e.g., multimedia content, data/information, etc.) after an end to the multicast communication session. The recipient devices 104*a,b,c* may be configured to process the content according to a predefined or preset codec.

At step 340, a message (e.g., one or more packets, an IP packet comprising a multicast group address in a IP header destination address field, etc.) indicating the end of the multicast communication session may be received via IP multicast (e.g., by the recipient devices 104*a,b,c* from the user device 102). The message may be part of the IP multicast or the message may be sent separately from the IP multicast. The message may be a flag, an identifier, a header, or any other indicator of the end of the multicast communication session. The flag, the identifier, the header, or any other indicator may be applied to a subsequent portion(s) (e.g., packet(s)), such as a last/final portion, of the content (e.g., multimedia content, data/information, etc.). The recipient devices 104*a,b,c* may end automatic processing of content (e.g., multimedia content, data/information, etc.) based on receiving the message indicating the end of the multicast communication session.

In some cases, the message indicating the end of the multicast communication session may be sent separate from and/or without content (e.g., multimedia content, data/information, etc.). In some cases, the message indicating the end of the multicast communication session may be sent as part of the multicast communication session, such that the multicast communication session is terminated and data/information may not be sent (as packets and/or datagrams, etc.) simultaneously and/or at substantially the same time/occurrence as ending/terminating of the multicast communication session. In some cases, the message indicating the end of the multicast communication session may include content (e.g., multimedia content, data/information, etc.). In some cases, the message indicating the end of the multicast communication session may not include content (e.g., multimedia content, etc.), such that all content is sent/exchanged during the multicast communication session prior to the message indicating the end of the multicast communication session. Content sent with the message indicating the end of the multicast communication session and/or received/exchanged during the multicast communication session may be encoded in packets and/or datagrams.

The message indicating the end of the multicast communication session be sent based on a time period, such as when the time period expires. The time period may be based on any amount/quantity of time, such as an amount/quantity of time required to process the content (e.g., multimedia content, data/information, etc.). The time required to process the content may be based on a user defined and/or a predetermined amount/quantity of time, a previous amount/quantity of time used to process content (e.g., similar content), and/or the like. The message indicating the end of the multicast communication session may be sent based on any occurrence or trigger condition.

Figure 4:
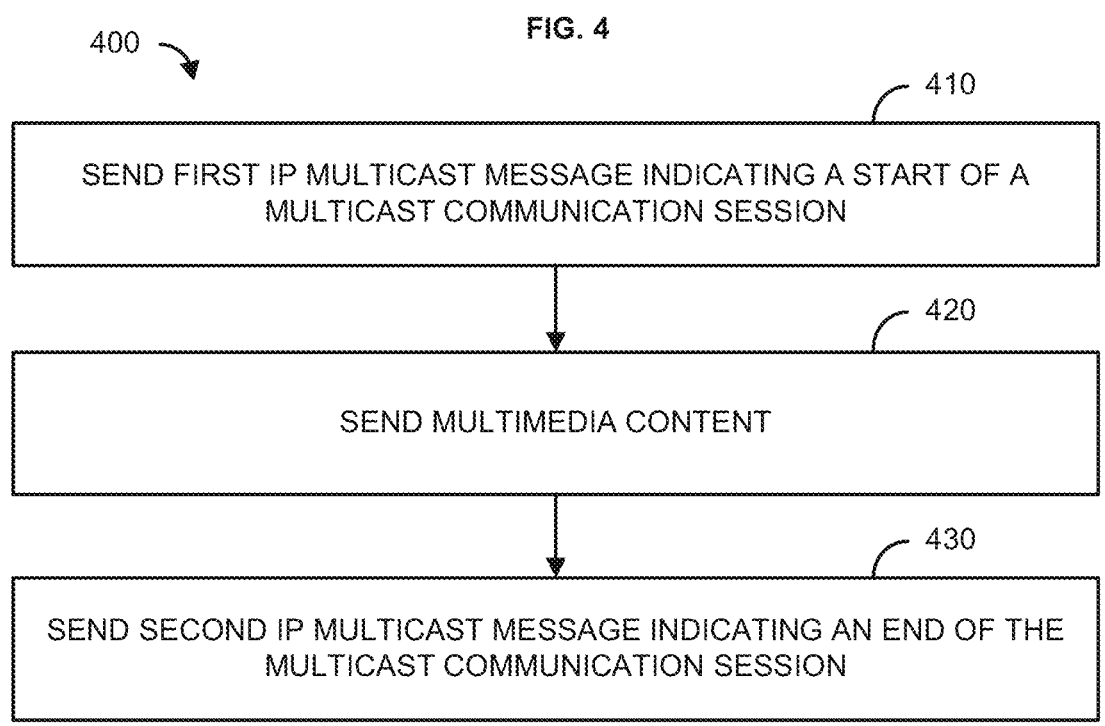
FIG. 4 shows a flowchart of a method for communication.

FIG. 4 is a flowchart 400 of a method for communication. The method 400 may be adapted to and/or suitable for any communication technique such as IP-based communications, multicast communications, unicast communications, wireless communications, and/or the like. At step 410, a message (e.g., one or more packets, an IP packet comprising a multicast group address in a IP header destination address field, etc.) indicating a start of a multicast communication session may be sent via IP multicast (e.g., by the user device 102 to one or more of the recipient devices 104*a,b,c*). The user device 102 and the one or more recipient devices 104*a,b,c* may be included in (associated with) a same subnet of the network 105. The message may be generated based on a trigger condition, such as a trigger condition associated with the user device 102 and/or any of the recipient devices 104*a,b,c*. The trigger condition may be based on a detection of motion by and/or associated with the user device 102 and/or any of the recipient devices 104*a,b,c*. The trigger condition may be based on the user device 102 and/or any of the recipient devices 104*a,b,c* detecting an interaction associated with the user device 102 and/or any of the recipient devices 104*a,b,c*, such as a press of a button and/or the like. The trigger condition may be based on the user device 102 and/or any of the recipient devices 104*a,b,c* determining that a threshold associated with the user device 102 and/or any of the recipient devices 104*a,b,c* is satisfied, such as product inventory threshold being satisfied by a low amount/quantity of product. The trigger condition may be based on any condition.

The message may be part of the IP multicast or the message may be sent separately from the IP multicast. The message indicating the start of the multicast communication session may be a flag, an identifier, a header, or any other indicator of the start of the multicast communication session. The message may be directed to a particular multicast group including the recipient device 104*a,b,c*. The message may be addressed to a multicast network address corresponding to the particular multicast group. In some cases, the message indicating the start of the multicast communication session may be sent separate from and/or without content (e.g., multimedia content, data/information, etc.). In some cases, the message indicating the start of the multicast communication session may be sent as part of the communication session, such that the communication session is established and data/information may be sent (as packets and/or datagrams, etc.) simultaneously and/or at substantially the same time/occurrence as initiation/establishment of the communication session. In some cases, the message indicating the start of the multicast communication session may include content (e.g., multimedia content, data/information, etc.). In some cases, the message indicating the start of the multicast communication session may not include content (e.g., multimedia content, etc.), and content may be received during the multicast communication session. Content sent with the message indicating the start of the multicast communication session and/or received during the multicast communication session may be encoded in packets and/or datagrams.

At step 420, content (e.g., multimedia content, data/information, etc.) may be sent via the IP multicast (e.g., by the user device 102 to the one or more recipient devices 104*a,b,c*). The content (e.g., multimedia content, data/information, etc.) may be directed to the particular multicast group including the one or more recipient devices 104*a,b,c*. The content (e.g., multimedia content, data/information, etc.) may be encoded in network traffic addressed to the multicast network address corresponding to the particular multicast group. The content (e.g., multimedia content, data/information, etc.) may be audio content and/or video content. A flag or a header of an initial portion(s) (e.g., packet(s)), such as a first/beginning portion, of the content (e.g., multimedia content, data/information, etc.) may indicate the start of the multicast communication session (see step 310).

The one or more recipient devices 104*a,b,c* may be configured to automatically process the content (e.g., multimedia content, data/information, etc.) sent by the user device 102. The one or more recipient devices 104*a,b,c* may be configured to automatically process the received content (e.g., multimedia content, data/information, etc.) (e.g., until receiving a message indicating an end of the multicast communication session). The one or more recipient devices 104*a,b,c* may be configured to process the content (e.g., multimedia content, data/information, etc.) in parallel with receiving the content (e.g., multimedia content, data/information, etc.) (e.g., in substantially real-time). The one or more recipient devices 104*a,b,c* may be configured to process the content (e.g., multimedia content, data/information, etc.) after an end to the multicast communication session. The one or more recipient devices 104*a,b,c* may be configured to process the content according to a predefined or preset codec.

Processing the content (e.g., multimedia content, data/information, etc.) may be decoding, transcoding, relaying, storing, rendering, playing, or otherwise interacting with the content. The recipient devices 104*a,b,c* may be receiver or speaker devices of an intercom system, and processing the content (e.g., multimedia content, data/information, etc.) may be playing audio content (e.g., multimedia content, data/information, etc.) received from a sending user device 102 having a microphone or other audio input. The recipient devices 104*a,b,c* may be a monitor of a video system (e.g., a security system, a baby monitoring system, or studio recording system), and processing the content (e.g., multimedia content, data/information, etc.) may be outputting, to a display, video and/or audiovisual content (e.g., multimedia content, data/information, etc.) received from a sending user device 102 (e.g., a camera). The recipient devices 104*a,b,c* may be a data storage unit of a system (e.g., a security system, a baby monitoring system, or studio recording system), and processing the content (e.g., multimedia content, data/information, etc.) may be storing content (e.g., multimedia content, data/information, etc.) received from a sending user device 102 (e.g., a camera and/or microphone).

At step 430, a message (e.g., one or more packets, an IP packet comprising a multicast group address in a IP header destination address field, etc.) indicating the end of the multicast communication session may be sent via the IP multicast (e.g., to the one or more recipient devices 104*a,b,c* by the user device 102). The message may be part of the IP multicast or the message may be sent separately from the IP multicast. The message may be a flag, an identifier, a header, or any other indicator of the end of the multicast communication session. The flag, the identifier, the header, or any other indicator may be applied to a subsequent portion(s), such as a last/final portion, of the content (e.g., multimedia content, data/information, etc.). Sending the message indicating the end of the multicast communication session may cause the one or more recipient devices 104*a,b,c* to end automatic processing of the content (e.g., multimedia content, data/information, etc.).

In some cases, the message indicating the end of the multicast communication session may be sent separate from and/or without content (e.g., multimedia content, data/information, etc.). In some cases, the message indicating the end of the multicast communication session may be sent as part of the multicast communication session, such that the multicast communication session is terminated and data/information may not be sent (as packets and/or datagrams, etc.) simultaneously and/or at substantially the same time/occurrence as ending/terminating of the multicast communication session. In some cases, the message indicating the end of the multicast communication session may include content (e.g., multimedia content, data/information, etc.). In some cases, the message indicating the end of the multicast communication session may not include content (e.g., multimedia content, etc.), such that all content is sent/exchanged during the multicast communication session prior to the message indicating the end of the multicast communication session. Content sent with the message indicating the end of the multicast communication session and/or received/exchanged during the multicast communication session may be encoded in packets and/or datagrams.

The message indicating the end of the multicast communication session may be sent based on a time period, such as when the time period expires. The time period may be based on any amount/quantity of time, such as an amount/quantity of time required to process the content (e.g., multimedia content, data/information, etc.). The time required to process the content may be based on a user defined and/or a predetermined amount/quantity of time, a previous amount/quantity of time used to process content (e.g., similar content), and/or the like. The message indicating the end of the multicast communication session may be sent based on any occurrence or trigger condition.

Figure 5:
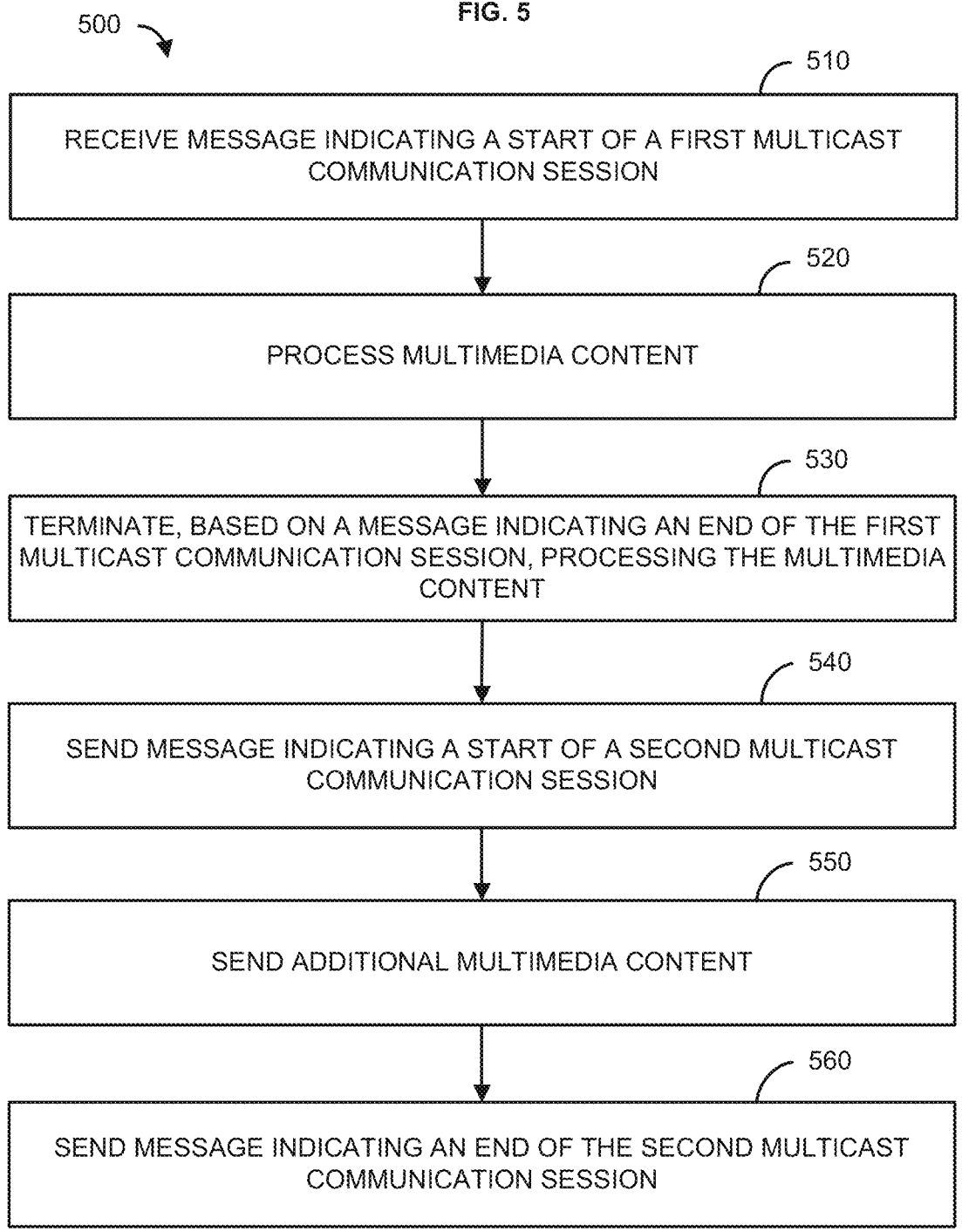
FIG. 5 shows a flowchart of a method for communication.

FIG. 5 is a flowchart 500 of a method for communications. The method 500 may be adapted to and/or suitable for any communication technique such as IP-based communications, multicast communications, unicast communications, wireless communications, and/or the like. Where user devices and/or recipient devices are capable of sending/receiving content (e.g., multimedia content, data/information, etc.), duplex communication (e.g., half-duplex communication, or full-duplex communication, etc.) may be achieved, enabled, and/or simulated by implementing multiple (e.g., at least two) IP multicast groups between and/or within which content may be exchanged (e.g., sent, received, etc.). User devices and/or recipient devices of and/or within different/separate IP multicast groups may receive and/or send content (e.g., multimedia content, data/information, etc.) via simplex IP multicast communication sessions (e.g., real-time simplex IP multicast communication sessions, etc.) where the exchange of content achieves, enables, and/or simulates duplex communication.

At step 510 a message (e.g., one or more packets, an IP packet comprising a multicast group address in a IP header destination address field, etc.) indicating the start of a first multicast communication session may be received via IP multicast (e.g., by a first user device 102 from a second user device 102). The first user device 102 and the second user device 102 be included in (associated with) a same subnet of a network 105. The message may be generated based on a trigger condition, such as a trigger condition associated with the first user device 102 and/or any of the recipient devices 104*a,b,c*. The trigger condition may be based on a detection of motion by and/or associated with the first user device 102 and/or any of the recipient devices 104*a,b,c*. The trigger condition may be based on the user device 102 and/or any of the recipient devices 104*a,b,c* detecting an interaction associated with the first user device 102 and/or any of the recipient devices 104*a,b,c*, such as a press of a button and/or the like. The trigger condition may be based on the first user device 102 and/or any of the recipient devices 104*a,b,c* determining that a threshold associated with the first user device 102 and/or any of the recipient devices 104*a,b,c* is satisfied, such as product inventory threshold being satisfied by a low amount/quantity of product. The trigger condition may be based on any condition.

The message may be part of the IP multicast or the message may be sent separately from the IP multicast. The message indicating the start of the first multicast communication session may be a flag, an identifier, a header, or any other indicator of the start of the multicast communication session. The message may be directed to a first multicast group including the first user device 102. The message may be addressed to a multicast network address corresponding to the first multicast group.

In some cases, the message indicating the start of the first multicast communication session may be sent separate from and/or without content (e.g., multimedia content, data/information, etc.). In some cases, the message indicating the start of the first multicast communication session may be sent as part of the first multicast communication session, such that the first multicast communication session is established and data/information may be sent (as packets and/or datagrams, etc.) simultaneously and/or at substantially the same time/occurrence as initiation/establishment of the first multicast communication session. In some cases, the message indicating the start of the first multicast communication session may include content (e.g., multimedia content, data/information, etc.). In some cases, the message indicating the start of the first multicast communication session may not include content (e.g., multimedia content, etc.), and content may be received during the first multicast communication session. Content sent with the message indicating the start of the first multicast communication session and/or received during the first multicast communication session may be encoded in packets and/or datagrams.

At step 520, first content (e.g., multimedia content, data/information, etc.) may be processed. The first content may be received via IP multicast (e.g., by the first user device 102 from the second user device 102). The content (e.g., multimedia content, data/information, etc.) may be directed to the first multicast group including the first user device 102. The first content (e.g., multimedia content, data/information, etc.) may be included in network traffic addressed to the multicast network address corresponding to the first multicast group. The first content (e.g., multimedia content, data/information, etc.) may be audio content and/or video content. A flag or header of an initial portion(s) (e.g., packet(s)), such as a first/beginning portion, of the first content (e.g., multimedia content, data/information, etc.) may indicate the start of the first multicast communication session (see step 410).

Processing the first content (e.g., multimedia content, data/information, etc.) may be decoding, transcoding, relaying, storing, rendering, playing, or otherwise interacting with the content. The first user device 102 may be configured to automatically process the received first content (e.g., multimedia content, data/information, etc.) (e.g., until receiving a message indicating an end of the first multicast communication session). The first user device 102 may be configured to process the first content (e.g., multimedia content, data/information, etc.) in parallel to receiving the content (e.g., multimedia content, data/information, etc.) (e.g., in substantially real-time). The first user device 102 may be configured to stop processing the first content (e.g., multimedia content, data/information, etc.) after an end to the first multicast communication session. The first user device 102 may be configured to process the first content according to a predefined or preset codec.

At step 530, processing of the first content may be terminated. A message (e.g., one or more packets, an IP packet comprising a multicast group address in a IP header destination address field, etc.) indicating the end of the first multicast communication session may be received via IP multicast (e.g., by the first user device 102 from the second user device 102). The message may be part of the IP multicast or the message may be sent separately from the IP multicast. The message may be a flag, an identifier, a header, or any other indicator of the end of the multicast communication session. The flag, the identifier, the header, or any other indicator may be applied to a subsequent portion(s) (e.g., packet(s)), such as a last/final portion, of the content (e.g., multimedia content, data/information, etc.). The first user device 102 may end automatic processing of first content (e.g., multimedia content, data/information, etc.) in response to receiving the message indicating the end of the first multicast communication session.

In some cases, the message indicating the end of the first multicast communication session may be sent separate from and/or without content (e.g., multimedia content, data/information, first content, etc.). In some cases, the message indicating the end of the first multicast communication session may be sent as part of the first multicast communication session, such that the first multicast communication session is terminated and data/information may not be sent (as packets and/or datagrams, etc.) simultaneously and/or at substantially the same time/occurrence as ending/terminating of the first multicast communication session. In some cases, the message indicating the end of the first multicast communication session may include content (e.g., multimedia content, data/information, first content, etc.). In some cases, the message indicating the end of first the multicast communication session may not include content (e.g., multimedia content, first content, etc.), such that all content is sent/exchanged during the first multicast communication session prior to the message indicating the end of the first multicast communication session. Content sent with the message indicating the end of the first multicast communication session and/or received/exchanged during the first multicast communication session may be encoded in packets and/or datagrams.

The message indicating the end of the first multicast communication session be sent based on a time period, such as when the time period expires. The time period may be based on any amount/quantity of time, such as an amount/quantity of time required to process the content (e.g., multimedia content, data/information, first content, etc.). The time required to process the content may be based on a user defined and/or a predetermined amount/quantity of time, a previous amount/quantity of time used to process content (e.g., similar content), and/or the like. The message indicating the end of the first multicast communication session be sent based on any occurrence and/or trigger condition.

At step 540 a message (e.g., one or more packets, an IP packet comprising a multicast group address in a IP header destination address field, etc.) indicating the start of a second multicast communication session may be sent via IP multicast (e.g., by the first user device 102). The message may be sent to one or more recipient devices 104a,b,c and/or the second user device 102. The first user device 102, second user device 102 and/or recipient devices 104a,b,c may be included in (associated with) a same subnet of the network 105. The message may be generated based on a trigger condition, such as a trigger condition associated with the second user device 102 and/or any of the recipient devices 104a,b,c. The trigger condition may be based on a detection of motion by and/or associated with the second user device 102 and/or any of the recipient devices 104a,b,c. The trigger condition may be based on the second user device 102 and/or any of the recipient devices 104a,b,c detecting an interaction associated with the second user device 102 and/or any of the recipient devices 104a,b,c, such as a press of a button and/or the like. The trigger condition may be based on the second user device 102 and/or any of the recipient devices 104a,b,c determining that a threshold associated with the second user device 102 and/or any of the recipient devices 104a,b,c is satisfied, such as product inventory threshold being satisfied by a low amount/quantity of product. The trigger condition may be based on any condition.

The message indicating the start of the second multicast communication session may be a flag, an identifier, a header, or any other indicator of the start of the second multicast communication session. The message may be directed to a second multicast group. The message may be addressed to a multicast network address corresponding to the second multicast group. In some cases, the message indicating the start of the second multicast communication session may be sent separate from and/or without content (e.g., multimedia content, data/information, second content, etc.). In some cases, the message indicating the start of the second multicast communication session may be sent as part of the second multicast communication session, such that the second multicast communication session is established and data/information may be sent (as packets and/or datagrams, etc.) simultaneously and/or at substantially the same time/occurrence as initiation/establishment of the second multicast communication session. In some cases, the message indicating the start of the second multicast communication session may include content (e.g., multimedia content, data/information, second content, etc.). In some cases, the message indicating the start of the second multicast communication session may not include content (e.g., multimedia content, data/information, second content, etc.), and content may be received during the second multicast communication session. Content sent with the message indicating the start of the second multicast communication session and/or received during the second multicast communication session may be encoded in packets and/or datagrams.

The second multicast group may include or exclude the second user device 102. The first multicast group and the second multicast group may at least partially overlap. The first multicast group and the second multicast group may include one or more user devices 102 and/or recipient devices 104a,b,c. Thus, one or more user devices 102 and/or recipient devices 104a,b,c may receive first content (e.g., multimedia content, data/information, etc.) from the second user device 102 via the first multicast communication session and second content (e.g., multimedia content, data/information, etc.) from the first user device 102 via the second multicast communication session.

At step 550, second content (e.g., multimedia content, data/information, etc.) may be sent via IP multicast (e.g., by the first user device 102 to the second user device 102 and/or one or more recipient devices 104a,b,c). The second content (e.g., multimedia content, data/information, etc.) may be directed to the second multicast group including the second user device 102 and/or the recipient devices 104a,b,c. The second content (e.g., multimedia content, data/information, etc.) may be encoded in network traffic addressed to the multicast network address corresponding to the second multicast group. The second content (e.g., multimedia content, data/information, etc.) may be audio content and/or video content. A flag or header of an initial portion(s) (e.g., packet(s)), such as a first/beginning portion, of the second content (e.g., multimedia content, data/information, etc.) may indicate the start of the second multicast communication session (see step 440).

The second user device 102 and/or one or more recipient devices 104a,b,c may be configured to automatically process the second content (e.g., multimedia content, data/information, etc.) sent by the first user device 102. The second content (e.g., multimedia content, data/information, etc.) may be processed in parallel to receiving the second content (e.g., multimedia content, data/information, etc.) (e.g., in substantially real-time). The second content (e.g., multimedia content, data/information, etc.) may be processed after an end to the second multicast communication session. The second content may be processed according to a predefined or preset codec. Processing the content (e.g., multimedia content, data/information, etc.) may be decoding, transcoding, relaying, storing, rendering, playing, or otherwise interacting with the content.

At step 560 a message (e.g., one or more packets, an IP packet comprising a multicast group address in a IP header destination address field, etc.) indicating the end of the second multicast communication session may be sent via IP multicast (e.g., to the second user device 102 and/or one or more recipient devices 104a,b,c by the first user device 102). The message may be a flag, an identifier, a header, or any other indicator of the end of the second multicast communication session. The flag, the identifier, the header, or any other indicator may be applied to a subsequent portion(s) (e.g., packet(s)), such as a last/final portion, of the content (e.g., multimedia content, data/information, etc.). Sending the message indicating the end of the second multicast communication session may cause the second user device 102 and/or one or more recipient devices 104a,b,c to end automatic processing of the second content (e.g., multimedia content, data/information, etc.).

In some cases, the message indicating the end of the second multicast communication session may be sent separate from and/or without content (e.g., multimedia content, data/information, second content, etc.). In some cases, the message indicating the end of the second multicast communication session may be sent as part of the second multicast communication session, such that the second multicast communication session is terminated and data/information may not be sent (as packets and/or datagrams, etc.) simultaneously and/or at substantially the same time/occurrence as ending/terminating of the second multicast communication session. In some cases, the message indicating the end of the second multicast communication session may include content (e.g., multimedia content, data/information, second content, etc.). In some cases, the message indicating the end of second the multicast communication session may not include content (e.g., multimedia content, second content, etc.), such that all content is sent/exchanged during the second multicast communication session prior to the message indicating the end of the second multicast communication session. Content sent with the message indicating the end of the second multicast communication session and/or received/exchanged during the second multicast communication session may be encoded in packets and/or datagrams.

The message indicating the end of the second multicast communication session be sent based on a time period, such as when the time period expires. The time period may be based on any amount/quantity of time, such as an amount/quantity of time required to process the additional content (e.g., multimedia content, data/information, etc.). The time required to process the additional content may be based on a user defined and/or a predetermined amount/quantity of time, a previous amount/quantity of time used to process content (e.g., similar content), and/or the like. The message indicating the end of the second multicast communication session be sent based on any occurrence and/or trigger condition.

Figure 6:
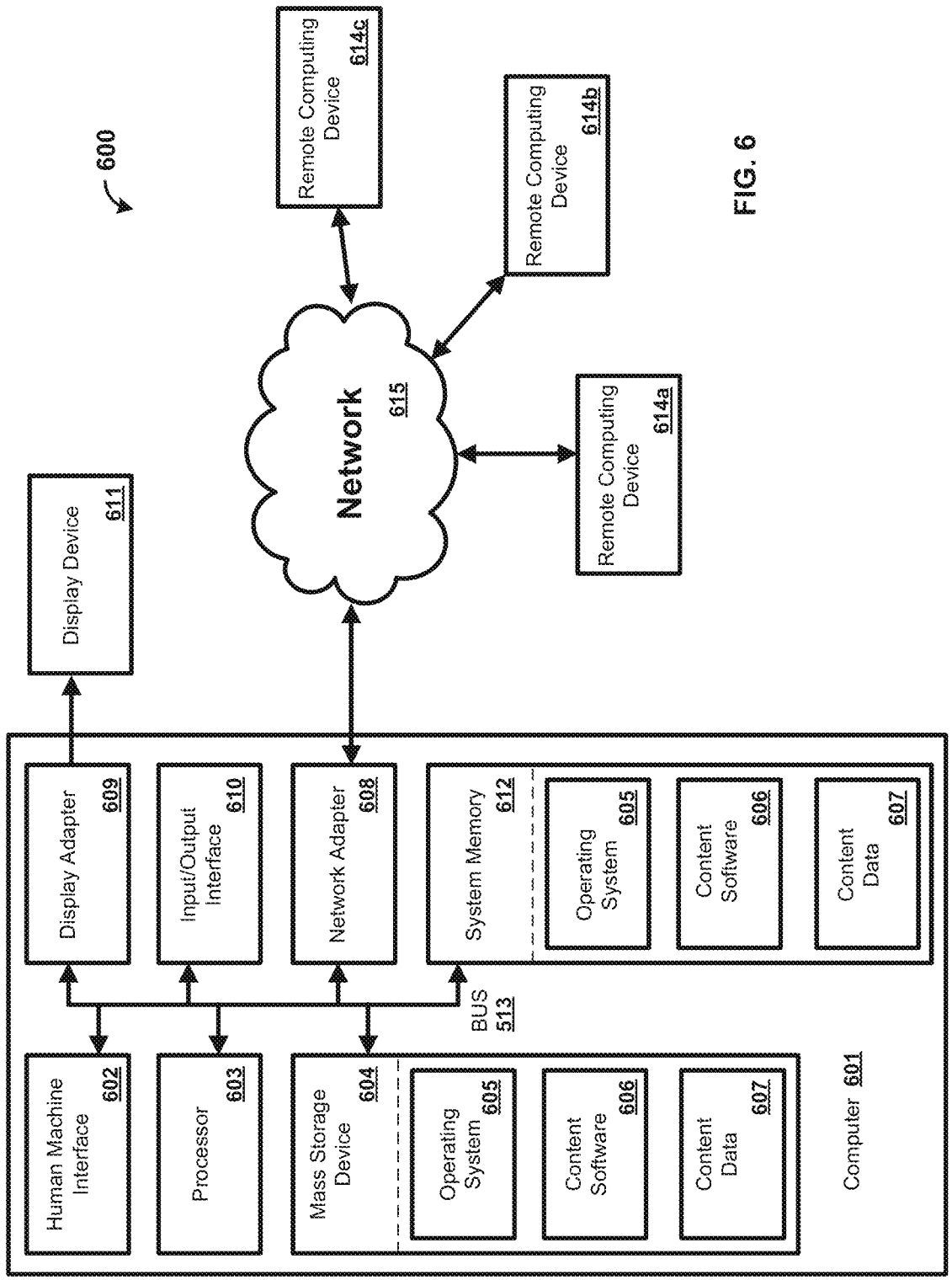
FIG. 6 shows a block diagram of a computing device for implementing communications.

FIG. 6 shows a system 600 for communication (e.g., IP-based communication, multicast communication, unicast communication, wireless communication, etc.). The user device 102 and/or recipient devices 104a,b,c of FIG. 1 may be a computer 501 as shown in FIG. 6.

The computer 601 may be one or more processors 603, a system memory 612, and a bus 613 that couples various components of the computer 601 having the one or more processors 603 to the system memory 612. In the case of multiple processors 603, the computer 601 may utilize parallel computing.

The bus 613 may be one or more of several possible types of bus structures, such as a memory bus, memory controller, a peripheral bus, an accelerated graphics port, and a processor or local bus using any of a variety of bus architectures.

The computer 601 may operate on and/or be a variety of computer readable media (e.g., non-transitory). Computer readable media may be any available media that is accessible by the computer 601 and may be non-transitory, volatile and/or non-volatile media, removable and non-removable media. The system memory 612 has computer readable media in the form of volatile memory, such as random access memory (RAM), and/or non-volatile memory, such as read only memory (ROM). The system memory 612 may store data such as content data 607 and/or program modules such as operating system 605 and content software 606 that are accessible to and/or are operated on by the one or more processors 603.

The computer 601 may also be other removable/non-removable, volatile/non-volatile computer storage media. The mass storage device 604 may provide non-volatile storage of computer code, computer readable instructions, data structures, program modules, and other data for the computer 601. The mass storage device 604 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Any number of program modules may be stored on the mass storage device 604. An operating system 605 and content software 606 may be stored on the mass storage device 604. One or more of the operating system 605 and content software 606 (or some combination thereof) may be program modules and the content software 606. Content data 607 may also be stored on the mass storage device 604. Content data 607 may be stored in any of one or more databases known in the art. The databases may be centralized or distributed across multiple locations within the network 615.

A user may enter commands and information into the computer 601 via an input device (not shown). Such input devices be, but are not limited to, a keyboard, pointing device (e.g., a computer mouse, remote control), a microphone, a joystick, a scanner, tactile input devices such as gloves, and other body coverings, motion sensor, and the like These and other input devices may be connected to the one or more processors 603 via a human machine interface 602 that is coupled to the bus 613, but may be connected by other interface and bus structures, such as a parallel port, game port, an IEEE 1394 Port (also known as a Firewire port), a serial port, network adapter 608, and/or a universal serial bus (USB).

A display device 611 may also be connected to the bus 613 via an interface, such as a display adapter 609. It is contemplated that the computer 601 may have more than one display adapter 609 and the computer 601 may have more than one display device 611. A display device 611 may be a monitor, an LCD (Liquid Crystal Display), light emitting diode (LED) display, television, smart lens, smart glass, and/or a projector. In addition to the display device 611, other output peripheral devices may be components such as speakers (not shown) and a printer (not shown) which may be connected to the computer 601 via Input/Output Interface 610. Any step and/or result of the methods may be output (or caused to be output) in any form to an output device. Such output may be any form of visual representation, including, but not limited to, textual, graphical, animation, audio, tactile, and the like. The display 611 and computer 601 may be part of one device, or separate devices.

The computer 601 may operate in a networked environment using logical connections to one or more remote computing devices 614a,b,c. A remote computing device 614a,b,c may be a personal computer, computing station (e.g., workstation), portable computer (e.g., laptop, mobile phone, tablet device), smart device (e.g., smartphone, smart watch, activity tracker, smart apparel, smart accessory), security and/or monitoring device, a server, a router, a network computer, a peer device, edge device or other common network node, and so on. Logical connections between the computer 601 and a remote computing device 614a,b,c may be made via a network 615, such as a local area network (LAN) and/or a general wide area network (WAN). Such network connections may be through a network adapter 608. A network adapter 608 may be implemented in both wired and wireless environments. Such networking environments are conventional and commonplace in dwellings, offices, enterprise-wide computer networks, intranets, and the Internet.

Application programs and other executable program components such as the operating system 605 are shown herein as discrete blocks, although it is recognized that such programs and components may reside at various times in different storage components of the computing device 601, and are executed by the one or more processors 603 of the computer 601. An implementation of content software 606 may be stored on or sent across some form of computer readable media. Any of the disclosed methods may be performed by processor-executable instructions embodied on computer readable media.

While specific configurations have been described, it is not intended that the scope be limited to the particular configurations set forth, as the configurations herein are intended in all respects to be possible configurations rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of configurations described in the specification.

It will be apparent to those skilled in the art that various modifications and variations may be made without departing from the scope or spirit. Other configurations will be apparent to those skilled in the art from consideration of the specification and practice described herein. It is intended that the specification and described configurations be considered as exemplary only, with a true scope and spirit being indicated by the following claims.

What is claimed is:

1. A method comprising:
   based on a trigger event, sending by a user device of a plurality of user devices associated with an Internet Protocol (IP) multicast group, a first packet of a plurality of packets, wherein the first packet comprises first content indicative of the trigger event and an indication configured to start an IP multicast communication session;
   sending, via the IP multicast communication session, one or more subsequent packets of the plurality of packets comprising subsequent content indicative of the trigger event;
   sending, via the IP multicast communication session, a second packet of the plurality of packets, wherein the second packet comprises second content indicative of the trigger event and an indication configured to end the IP multicast communication session; and
   causing, based on the indication configured to end the IP multicast communication session, termination of the IP multicast communication session.

2. The method of claim 1, wherein the user device is associated with a codec, the method further comprising:
   processing the first content, wherein processing the first content comprises one or more of encoding or decoding at least a portion of the first content based on the codec.

3. The method of claim 1, further comprising:
   receiving, from a second user device, a discovery request; and
   sending, based on the discovery request, a message configured to cause the second user device to be associated with the IP multicast group.

4. The method of claim 1, wherein the trigger event comprises one or more of detecting a motion associated with a second user device, detecting an interaction associated with the second user device, or determining that a threshold associated with the second user device is satisfied.

5. The method of claim 2, wherein the first packet comprises multimedia content, wherein processing the multimedia content comprises automatically processing, based on the first packet, the multimedia content.

6. The method of claim 5, wherein processing the multimedia content comprises one or more of decoding, rendering, playing, or recording the multimedia content.

7. An apparatus comprising:
   one or more processors; and
   memory storing processor-executable instructions that, when executed by the one or more processors, cause the apparatus to:
   based on a trigger event, send, a first packet of a plurality of packets, wherein the first packet comprises first content indicative of the trigger event and an indication configured to start an IP multicast communication session;
   send, via the IP multicast communication session, one or more subsequent packets of the plurality of packets comprising subsequent content indicative of the trigger event;
   send, via the IP multicast communication session, a second packet of the plurality of packets, wherein the second packet comprises second content indicative of the trigger event and an indication configured to end the IP multicast communication session; and
   cause, based on the indication configured to end the IP multicast communication session, termination of the IP multicast communication session.

8. The apparatus of claim 7, wherein the processor-executable instructions, when executed by the one or more processors, further cause the apparatus to:
   process the first content, wherein processing the first content comprises one or more of encoding or decoding at least a portion of the first content based on a codec.

9. The apparatus of claim 7, wherein the processor-executable instructions, when executed by the one or more processors, further cause the apparatus to:
   receive, from a second user device, a discovery request; and
   send, based on the discovery request, a message configured to cause the second user device to be associated with an IP multicast group.

10. The apparatus of claim 7, wherein the trigger event comprises one or more of detecting a motion associated with a second user device, detecting an interaction associated with the second user device, or determining that a threshold associated with the second user device is satisfied.

11. The apparatus of claim 7, wherein the first packet comprises multimedia content, and wherein the processor-executable instructions, when executed by the one or more processors, further cause the apparatus to:
   process the multimedia content, wherein processing the multimedia content comprises one or more of decoding, rendering, playing, or recording the multimedia content.

12. One or more non-transitory computer-readable media storing processor-executable instructions that, when executed by at least one processor, cause the at least one processor to:
   based on a trigger event, send, a first packet of a plurality of packets, wherein the first packet comprises first content indicative of the trigger event and an indication configured to start an IP multicast communication session;
   send, via the IP multicast communication session, one or more subsequent packets of the plurality of packets comprising subsequent content indicative of the trigger event;
   send, via the IP multicast communication session, a second packet of the plurality of packets, wherein the second packet comprises second content indicative of the trigger event and an indication configured to end the IP multicast communication session; and cause, based on the indication configured to end the IP multicast communication session, termination of the IP multicast communication session.

13. The one or more non-transitory computer-readable media of claim 12, storing processor-executable instructions that, when executed by the at least one processor, cause the at least one processor to:

process the first content, wherein processing the first content comprises one or more of encoding or decoding at least a portion of the first content based on a codec.

14. The one or more non-transitory computer-readable media of claim 12, storing processor-executable instructions that, when executed by the at least one processor, cause the at least one processor to:

receive, from a user device, a discovery request; and send, based on the discovery request, a message to cause the user device to be associated with an IP multicast group.

15. The one or more non-transitory computer-readable media of claim 12, wherein the trigger event comprises one or more of detecting a motion associated with a second user device, detecting an interaction associated with the second user device, or determining that a threshold associated with the second user device is satisfied.

16. The one or more non-transitory computer-readable media of claim 12, wherein the first packet comprises multimedia content, and wherein the processor-executable instructions, when executed by the at least one processor, further cause the at least one processor to:

process the multimedia content, wherein processing the multimedia content comprises one or more of decoding, rendering, playing, or recording the multimedia content.

17. A system comprising:

a computing device configured to:

based on a trigger event, send, a first packet of a plurality of packets, wherein the first packet comprises first content indicative of the trigger event and an indication configured to start an IP multicast communication session;

send, via the IP multicast communication session, one or more subsequent packets of the plurality of packets comprising subsequent content indicative of the trigger event;

send, via the IP multicast communication session, a second packet of the plurality of packets, wherein the second packet comprises second content indicative of the trigger event and an indication configured to end the IP multicast communication session;

cause, based on the indication configured to end the IP multicast communication session, termination of the IP multicast communication session; and a user device configured to:

receive the first packet of the plurality of packets.

18. The system of claim 17, wherein the computing device is configured to process the first content, wherein processing the first content comprises one or more of encoding or decoding at least a portion of the first content based on a codec.

19. The system of claim 17, wherein the computing device is configured to:

receive, from a second user device, a discovery request; and send, based on the discovery request, a message to cause the second user device to be associated with an IP multicast group.

20. The system of claim 17, wherein the trigger event comprises one or more of detecting a motion associated with a second user device, detecting an interaction associated with the second user device, or determining that a threshold associated with the second user device is satisfied.

* * * * *